United States Patent
Feldman et al.

(10) Patent No.: US 10,559,177 B2
(45) Date of Patent: Feb. 11, 2020

(54) AREA AND PROPERTY MONITORING SYSTEM AND METHOD

(71) Applicants: Dean Michael Feldman, Springboro, OH (US); Timothy J Pierson, Hanover, NH (US)

(72) Inventors: Dean Michael Feldman, Springboro, OH (US); Timothy J Pierson, Hanover, NH (US)

(*) Notice: Subject to any disclaimer, the term of this patent is extended or adjusted under 35 U.S.C. 154(b) by 0 days.

(21) Appl. No.: 15/669,816

(22) Filed: Aug. 4, 2017

(65) Prior Publication Data
US 2018/0040217 A1    Feb. 8, 2018

Related U.S. Application Data

(60) Provisional application No. 62/370,941, filed on Aug. 4, 2016.

(51) Int. Cl.
G08B 13/00 (2006.01)
G08B 13/24 (2006.01)
H04W 8/00 (2009.01)

(52) U.S. Cl.
CPC .............. *G08B 13/24* (2013.01); *H04W 8/005* (2013.01)

(58) Field of Classification Search
CPC ......... G08B 13/24; H04W 4/02; H04W 8/005
USPC ........................................................ 340/565
See application file for complete search history.

(56) References Cited

U.S. PATENT DOCUMENTS

| | | | | |
|---|---|---|---|---|
| 7,971,253 | B1* | 6/2011 | Gupta | H04L 63/1416 726/11 |
| 9,344,907 | B1* | 5/2016 | Kravets | H04W 24/06 |
| 9,961,079 | B1* | 5/2018 | Wang | H04L 63/0876 |
| 2001/0019357 | A1* | 9/2001 | Ito | G08B 13/19604 348/152 |
| 2003/0232598 | A1* | 12/2003 | Aljadeff | G01S 5/06 455/41.2 |
| 2004/0257209 | A1* | 12/2004 | Yang | B60R 25/1003 340/426.13 |
| 2004/0258082 | A1* | 12/2004 | Morisaki | H04M 1/00 370/412 |
| 2005/0052533 | A1* | 3/2005 | Ito | G01S 3/7865 348/169 |
| 2005/0195753 | A1* | 9/2005 | Chaskar | H04W 8/005 370/254 |

(Continued)

*Primary Examiner* — Zhen Y Wu
(74) *Attorney, Agent, or Firm* — Thomas E. Lees, LLC (57) ABSTRACT

Embodiments herein provide methods and apparatus for monitoring and/or protecting property or other area is presented. Aspects of invention provide devices, software, systems, and methods for property and area monitoring that detect the presence of wireless devices on or over a property or in a particular geographical area. In some embodiments the detected wireless device and/or owner of a detected device can be identified. Embodiments provide methods and system for detection of wireless devices, identifiers, record time and duration that detected device was active on a property or within an area, record and transmit information to remote storage, and/or alert authorized individuals of activity within a monitored area. Embodiments of the invention allow systems and methods to work independent or with remote sensors to perform pre-programmed functions upon detection of a wireless device. Embodiments present a method for mobile configuration for scanning an area.

17 Claims, 7 Drawing Sheets

(56) References Cited

U.S. PATENT DOCUMENTS

| | | | |
|---|---|---|---|
| 2005/0237166 A1* | 10/2005 | Chen | B60R 25/1003 340/426.13 |
| 2006/0193300 A1* | 8/2006 | Rawat | H04L 63/1408 370/338 |
| 2008/0061962 A1* | 3/2008 | Campman | G07C 9/00111 340/539.13 |
| 2011/0285506 A1* | 11/2011 | Hillis | G08B 21/0238 340/8.1 |
| 2012/0258707 A1* | 10/2012 | Mathias | H04W 36/30 455/426.1 |
| 2015/0068069 A1* | 3/2015 | Tran | H04B 1/385 36/136 |
| 2015/0163626 A1* | 6/2015 | Zimmer | H04W 4/029 455/404.2 |
| 2015/0198708 A1* | 7/2015 | Khan | G01S 13/38 342/146 |
| 2016/0165449 A1* | 6/2016 | Poisner | H04L 63/10 726/4 |
| 2016/0189500 A1* | 6/2016 | Kim | H04W 4/70 386/223 |
| 2017/0013449 A1* | 1/2017 | Raman | G06F 16/951 |
| 2017/0195838 A1* | 7/2017 | Mori | H04W 8/186 |
| 2017/0223765 A1* | 8/2017 | Justen | H04L 12/2834 |
| 2017/0245143 A1* | 8/2017 | Lindheimer | H04W 8/26 |
| 2017/0303094 A1* | 10/2017 | Collar | H04L 41/069 |
| 2018/0139219 A1* | 5/2018 | Sabata | H04L 63/1416 |

\* cited by examiner

FIG. 1

| Data Entry/Display Screen 200 | | | |
|---|---|---|---|
| Custom Name 210 | Date Time Active Area 220 | Identifier (MAC) 230 | Menu 240 |
| Dad's Phone | 4/1/16 7PM – 7AM | 106B37M4 | ▼ |
| Contractor | 4/3/16 8AM – 4PM | AF398GWZ | ▼ |
| Unassigned ID | 4/3/16 9PM - 9:15PM | J8YNTWIN | ▼ |
| Unassigned ID | 4/4/16 6:22:346 - 6:24:484 | SM2385ZK | ▼ |

▼ Menu dropdown from Data Entry Screen to customize identifier and set preprogrammed action options.
240

Associated MAC or Identifier: J8YNTWIN
Name customize : ________________________
Set Action242: - Send text / email alerts to ________________________
              - Call with pre recorded/programmed message
                 (____)________________
            - Alert during these hours: ______ - ______

Targeted monitoring device

As a Tracking System

AREA AND PROPERTY MONITORING SYSTEM AND METHOD

BACKGROUND

The present invention pertains to wireless devices, particularly to wireless security devices.

These days many people carry electronic devices that have some manner of wireless communication capabilities such as Wi-Fi®, BLUETOOTH®, cellular (such as GSM or CDMA), or other radio frequency (RF) connectivity. Wi-Fi is a registered trademark of Wi-Fi Alliance, a California Corporation, having an address of 10900-B Stonelake Boulevard, Suite 126 Austin, Tex. 78759. Bluetooth is a registered trademark of Bluetooth SIG, Inc., a Delaware Corporation having an address of 5209 Lake Washington Boulevard, Suite 350, Kirkland, Wash. 98033. This connectivity is often found in electronic devices such as phones, tablet computers, laptop computers, or wearable technology such as fitness trackers or smart watches and automobiles. Additionally, increased popularity of autonomous vehicles, drones, robotics and other self-propelled craft is generating increased interest to monitor for their presence. These craft often employ wireless communications as part of their normal operation.

Electronic wireless devices with wireless communication capabilities frequently transmit wireless signals containing elements that uniquely identify the particular device. For example, Wi-Fi®, BLUETOOTH® radios in a device transmit a Media Access Control (MAC) number (often called the radio's address) that is specific to the particular electronic wireless device (e.g., each iPhone, for instance, has a unique Wi-Fi® MAC address that no other wireless device uses). These wireless signals allow for specific identification of wireless devices and can be passively observed and recorded. Other communications modalities such as cellular phones use other unique device identifiers that can also be passively observed and recorded.

SUMMARY

Embodiments herein provide methods and apparatus for monitoring and protecting property or other area. A method embodiment for detecting unknown or known and unwanted digital devices, equipped with wireless transceivers, within the bounds of a defined perimeter comprising: creating a database of digital device identification (ID) for devices that are 1) acceptable and 2) known but unwanted and 3) unknown and unwanted, to be operated within the perimeter, and storing the database in a computer memory accessible by a processor; scanning for digital transmissions within the perimeter using a plurality of wireless transceivers configured to scan using a plurality of digital protocols, frequencies and modulations; for each digital transmission acquired, if possible, establish communications between the device emitting the signal and the one or more of the plurality of transceivers and determine one or more of: 1) the direction the transmission is coming from relative to the location of the one or more receiving transceivers, 2) the approximate location of the emitting device, 3) the signal strength for the transmission, and 4) a unique device identification; storing in the database, for all of the acquired transmissions: 1) the relative direction from the one or more detecting transceivers, 2) the location, 3) the ID 4) the time and date, and 5) the signal strength; using instructions on the processor, compare the IDs of the detected devices with those in the database to determine if the acquired IDs are from acceptable devices or known but unwanted devices; and for devices not known to be acceptable: if signal strength was determined: for each digital transmission that exceeds the minimum signal strength required to be detected at the distance between the perimeter and the receiving transceiver, measured in the direction of the transmission, report the ID and optionally the location within the perimeter based on the signal strength; and if the location of a detected device was determined and it is within the perimeter, report the ID and location within the perimeter to the user; and report the findings. Reporting includes an alert sent to a user, immediately after detection, for both unknown devices and unacceptable devices that are within the perimeter.

In system embodiments, a property security system is provided where the unknown devices and the known but not wanted devices within the perimeter are considered intruders. In other embodiments, the approximate location of detected devices is determined by triangulation when the digital transmission is detected by at least two, but preferably three or more transceivers with overlapping detection ranges. In other embodiments, the digital protocols detected include one of BLUETOOTH®; Wi-Fi®; GSM; or CDMA digital protocols.

In other embodiments, the perimeter is irregular and the plurality of wireless transceivers are placed such that all of the area within the perimeter is within the detection limits of at least one transceiver. In embodiments, known devices comprise one or more wireless routers and all devices known to the one or more routers or that communicate with the one or more routers are included in the database of known devices.

In yet other embodiments, the security system further includes surveillance devices which can be trained to monitor in the direction of the determined location of the detected unknown devices. One or more transceivers further includes a directional antenna wherein the geometry of the detection limit of the one or more transceiver the perimeter is cone shaped.

In still other method embodiments, a method for detecting unknown digital devices or known and unwanted digital devices, equipped with wireless transceivers, within the bounds of a regular perimeter includes creating a database of digital device IDs for devices that are 1) acceptable, and 2) known but unwanted and 3) unknown and unwanted, to be operated within the perimeter, and storing the database in a computer memory accessible by a processor; scanning for digital transmissions within the perimeter using a wireless transceiver with a distance of detection at or greater than the desired radius of the regular perimeter and configured to scan using a plurality of digital protocols, frequencies and modulations; for each digital transmission acquired by scanning, attempting to establish two-way communications between the device emitting the digital transmission and the transceiver, and acquiring the signal strength for the transmission, and a unique device identification; storing the established IDs and signal strengths for each transmission at each receiving transceiver in the database; using instructions on the processor to compare the IDs of the detected devices with those of the approved devices and known but unwanted devices to determine if the acquired IDs are from acceptable devices, unacceptable or unknown devices; and reporting the findings.

A system embodiment for detecting unknown digital devices or known and unwanted digital devices, equipped with wireless transceivers, within the bounds of a regular perimeter, including a sentinel wireless transceiver configured to scan for digital transmissions within the regular perimeter, with a distance of detection being at or greater than the desired radius of the regular perimeter and configured to scan using a selected digital protocol, frequency, and modulation; wherein for each acquired digital transmission, the transceiver is configured to acquire a respective digital transmission signal strength and a respective unique device identification; a database configured to be stored in a computer memory and to be accessible by a processor, wherein the database is structured to contain digital device IDs for devices operated within the perimeter that are 1) acceptable, and 2) known but unwanted or 3) unknown and unwanted, wherein the database is structured to store a respective established unique device identification and a respective signal strength for each transmission received at each transceiver associated with the database; a processor configured to compare the respective acquired unique device identification of a detected device with those of the approved devices and known but unwanted devices stored in the database, and configured to determine if the acquired IDs are from a device type of acceptable device, unacceptable or unknown device, and configured to report the device type.

In certain embodiments, a portable electronic device includes a transceiver coupled to a processor and database. A system may be implemented on one or more digital computing devices that implements one of the methods described herein.

DETAILED DESCRIPTION OF THE EMBODIMENTS

Embodiments of the current invention will be described now with detail in reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention.

In the current specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the current invention encompasses current and future known equivalents to the components referred to herein by way of illustration.

Aspects of the invention provide devices, software, systems, and methods for property and area monitoring that detect the presence of wireless devices on or over a property or in a particular geographical area. In some embodiments the owner of the device can be identified. An embodiment of the invention may function as a security monitoring device and system. The security monitoring system feature can monitor property or an area, detect wireless devices, record unique wireless electronic device identifiers, record time and duration that the device was active on a property or within an area, record and transmit information to a cloud-based server, and/or alert authorized individuals of activity within a property or area. Embodiments of the invention can perform a number of pre-programmed functions for example, to send an electronic notification to the users computer or mobile device upon detection of a wireless device (or notify a user of a trigger event). The monitoring device can also work, in an embodiment, in conjunction with remote sensors to perform a number of pre-programmed functions (or events).

One embodiment of the property and area monitoring system allows operation as a security device. The invention can indicate the presence of detected wireless radio frequency (RF) signals broadcast by devices carried by humans or in vehicles while on or near a property or area. Upon detection of a wireless signal the device can perform a number of preprogrammed actions. Invention may detect and log information gathered including but not limited to: electronic signature identifier, signal strength, invention device location, time and duration a wireless device was detected within the monitored area.

The owner of a wireless device on a property or in an area can often be positively identified. Previous approaches relying on cameras or motion sensors can sometimes detect the presence of humans, but cannot uniquely identify the person.

This system is not prone to false alarms. Where other security detection systems and devices have failed because they rely on systems integrated with but not limited to cameras or motion sensors are which are sometimes prone to false alarms caused by animals, convection, flora, wind and the like. Because these things do not generally carry nor associated with wireless electronic devices, this system is not susceptible to this type of false alarms.

Embodiments of this invention can provide a low cost way to monitor an area for intrusion by humans carrying RF devices or autonomous vehicles. Other security systems often require sensors in a property or area to be hard-wired back to a central controller. Additionally, in order to cover a large area, systems often utilize video cameras, motion or sound sensors that can monitor a relatively small space. This can require multiple devices, expensive cable runs, and is impractical for covering large areas. Because wireless signals emanating from wireless electronic devices can be detected from long distances (up to several kilometers in some cases), a relatively small number of devices are required for our system.

Some embodiments of the invention do not require a long-term service contract or internet connectivity. Data is stored on a local device. Alternatively, when the system is integrated with a wireless or other transmission connection, the collected data can then be transferred to a remote or cloud-based type storage. Embodiments of the invention allow a user to customize specific user id's and/or device identifiers. A user can correlate these id's with their own registered labels. For example a user can correlate "Dad's phone" with dad's unique wireless MAC identifier or employee Jack's iPad can be registered in a similar manner. Embodiments with an integrated Global Positioning System (GPS) device provide the ability to determine the location that the wireless device identifier is detected. Embodiments of this invention have the ability to label and identify wireless signals that are routinely on the property or location and are not of concern, for example, the mobile phone of the mailman.

An embodiment of the invention allows the system to function independently of additional sensors to be installed necessary to activate an alert. Other security monitors fail to act independently and rely on sensors installed on entryway, door or window opening to activate a monitoring system. These doors, windows or other entryways are typically equipped with a separate sensor switching apparatus. The inventions system can identify the presence of a wireless signal independent of additional sensor equipment to be installed.

Another embodiment the invention does allow for integration of additional sensors. For example, the system may utilize integrated Bluetooth or similar sensors, much like an electronic eye on a garage door utilizes for detection of people, animals, or vehicles blocking the door. When sensors located, for example between a doorway, are interrupted a message indicating the disruption will be transmitted to the system. The invention can then take a preprogrammed action. Preprogrammed action can include sending an alert. Examples of events that could be detected are the presence of door opening, window opening, car passing through a driveway. This would be especially helpful when no wireless device is present in the monitored area. This would be helpful when no wireless device is detected in the monitored area and external sensors provide redundancies in a comprehensive security and monitoring system.

Another embodiment of the invention can perform a preprogrammed customizable event when a specific identifier is detected. For example, a former employee or friend has a known wireless device identifier registered with the system. If that specific identifier is detected in the control area, an alarm indication may be sent to the systems linked smart phone or computer. Alarm indication can be sent by text, email, phone call or other medium. Alarms can be sent to multiple people such as: the system owner, a security monitoring company, and/or the police.

Embodiments of the invention records the detected wireless activity in the monitored area and stores that information. Law or government official can utilize the recorded data to help determine who is or was within a monitored area at a particular point in time. The recorded data provide critical information including specific unique identification signature. Optionally the time of day, GPS coordinates, and the duration wireless device was in an area. This would allow historical analysis of the stored data. That information may help law and or government officials with solutions to criminal activity.

In embodiments, the sensitivity of the system can be automatically adjusted. By monitoring for devices that successfully authenticate to existing infrastructure the system can learn the Received Signal Strength Indication (RSSI— the amount of wireless signal strength measured by a device or devices that belong on a property or in an area). The system can then use that RSSI information to dynamically and automatically adjust its sensitivity to monitor devices that are on a particular property in an area and exclude false alarms from monitoring neighboring property or areas.

The sensitivity of the system can be manually adjusted. With the use of gain control and or directional antennas the control area can be increased or decreased or range can be narrowed for a targeted monitored area. Control areas may include a primary building, additional out buildings, remote or open land, specific locations and more. Other inventions have failed to monitor the exterior of a building, vacant land or outbuildings. The ability to increase or decrease the control area by tuning the sensitivity of the system allows a range customized monitored area.

Embodiments of the invention can be used on remote or vacant land. The device can operate utilizing battery, solar or other off-grid remote power source. This allows use on properties with little or no utility supplied power source. Vacant land because of the larger areas can generally be difficult to monitor. Sometimes larger properties or areas contain natural resources or equipment that owners find difficult to monitor with traditional monitoring devices. The data detected can be logged and stored on an internal drive system for manual retrieval or the recorded data can be uploaded to the cloud storage by a wireless device. The data can be associated to take a preprogrammed action.

Embodiments of this system can be used in conjunction with existing monitoring or security solutions like smart home systems to provide are more complete picture of activity on a property or in an area. For example, camera footage could be combined with electronic identifiers collected by this system to more positively identify activity on a property or in an area. The invention system can be configured in day or night mode. For example a remote residential location shouldn't see wireless activity 3:00 am. In this situation the system can be preprogrammed to send an alert to the property owner even if the property owner is away on vacation.

Briefly, some embodiments of the invention provide devices, systems, and methods for monitoring an area or property for wireless signal identifiers.

Figure 1:
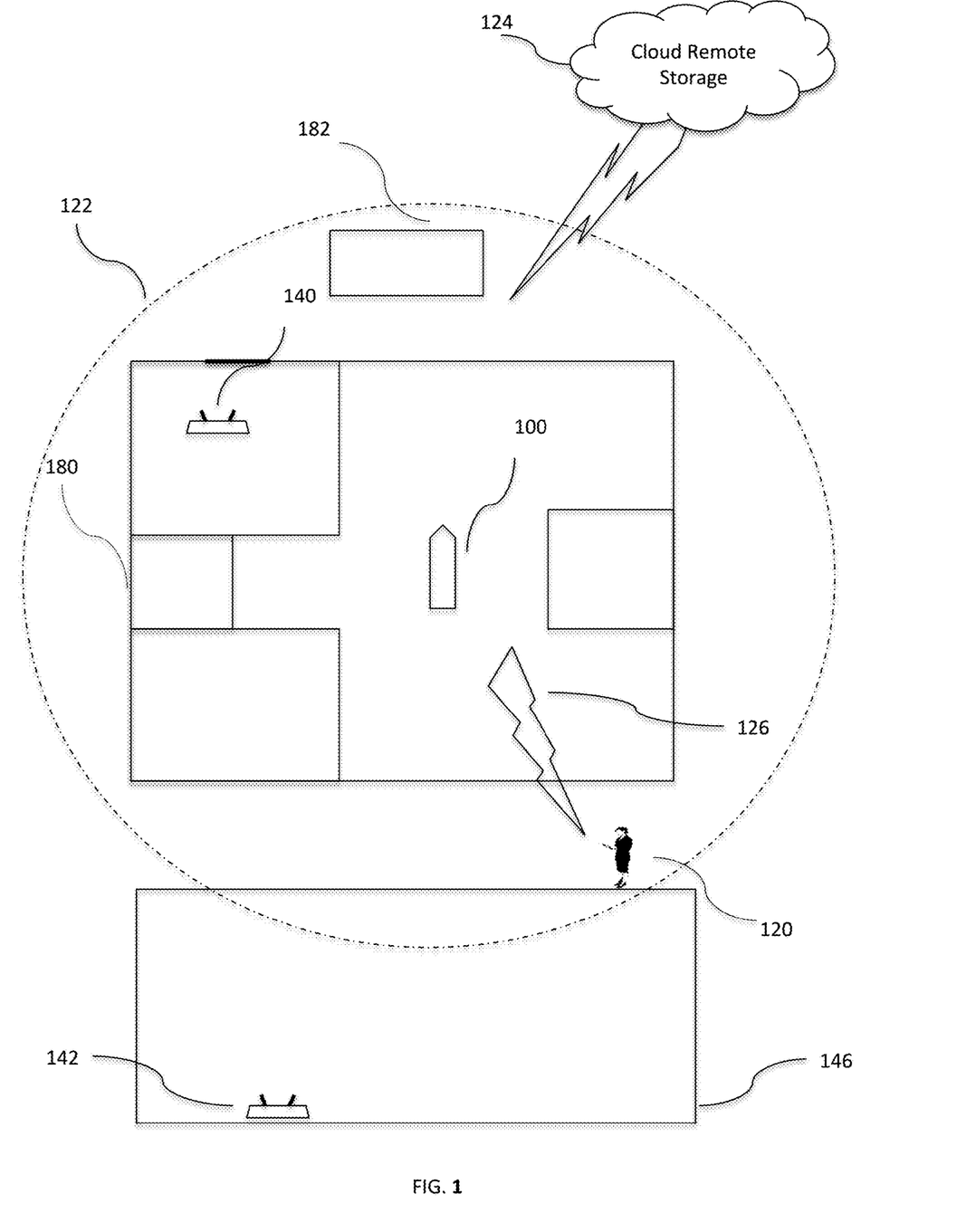
FIG. 1. depicts a locality where embodiments of the present invention may operate, in accordance with the teachings of the present invention.

FIG. 1 depicts an overview of an embodiment of the present invention. A perimeter 122, is desired to be monitored for intrusion by either people and/or vehicles. Vehicles can be on the ground or in the air. The monitoring area can be for example a yard surrounding a house or office 180 and may include additional outbuildings 182. The monitoring system comprises 100: a central processor or computing device and radio transceiver configured for wireless electric signal detection. Wireless signals 126 emanating from electronic device 120, are detected within the perimeter 122. These wireless signals can, for example, be Bluetooth®, WiFi®, RFID, cellular, and others. Electronic devices 120 that produce the wireless signal are, for example, mobile phones, fitness trackers, remotely operated or autonomous ground or air vehicles, laptop computers and more. FIG. 1 also illustrates a second wireless network 142 in a building 146 for context.

A unique wireless signal is depicted emanating from wireless electronic devices 120, for example, carried by a person. Aspects of the monitoring system 100 detects the presence of device emitting wireless signals 126 on or above a property or in a particular geographical monitored perimeter 122. Some embodiments of the invention can positively identify the wireless device identified on the property or in the area. Wireless electronic devices 120 are typically not shared between users, therefore positively identifying the device(s), for example a MAC ID, is a good indication that a particular person(s) is in an area. As such, the system or method may function as a security monitor.

Embodiments of the invention can monitor real-estate property or a perimeter 122 for intrusion by people carrying electronic devices much like security video cameras work as surveillance system. Instead of looking for video, wireless signals 126 emanating from a wireless devices 120 are detected in an area. Upon detection of wireless device 120, the data received is collected may be held on an internal storage system or transmitted via wireless network 140 to a cloud storage 124. Depending on the wireless protocol being used by the device, wireless signals can be detected from a large distance, in some cases several miles, and without the need for a direct line of sight (e.g., signals can travel through walls, trees), a large geographical area can be monitored, whereas cameras and motion sensors are restricted to their limited field of view.

After detecting the presence of wireless devices 120, a property or area owner can be alerted to the presence of a person on their property.

Furthermore, the monitoring system may be used in conjunction with traditional security devices such as smart home systems, cameras and motion detectors to augment the data collected about a human intruding on a property or area.

Figure 2:
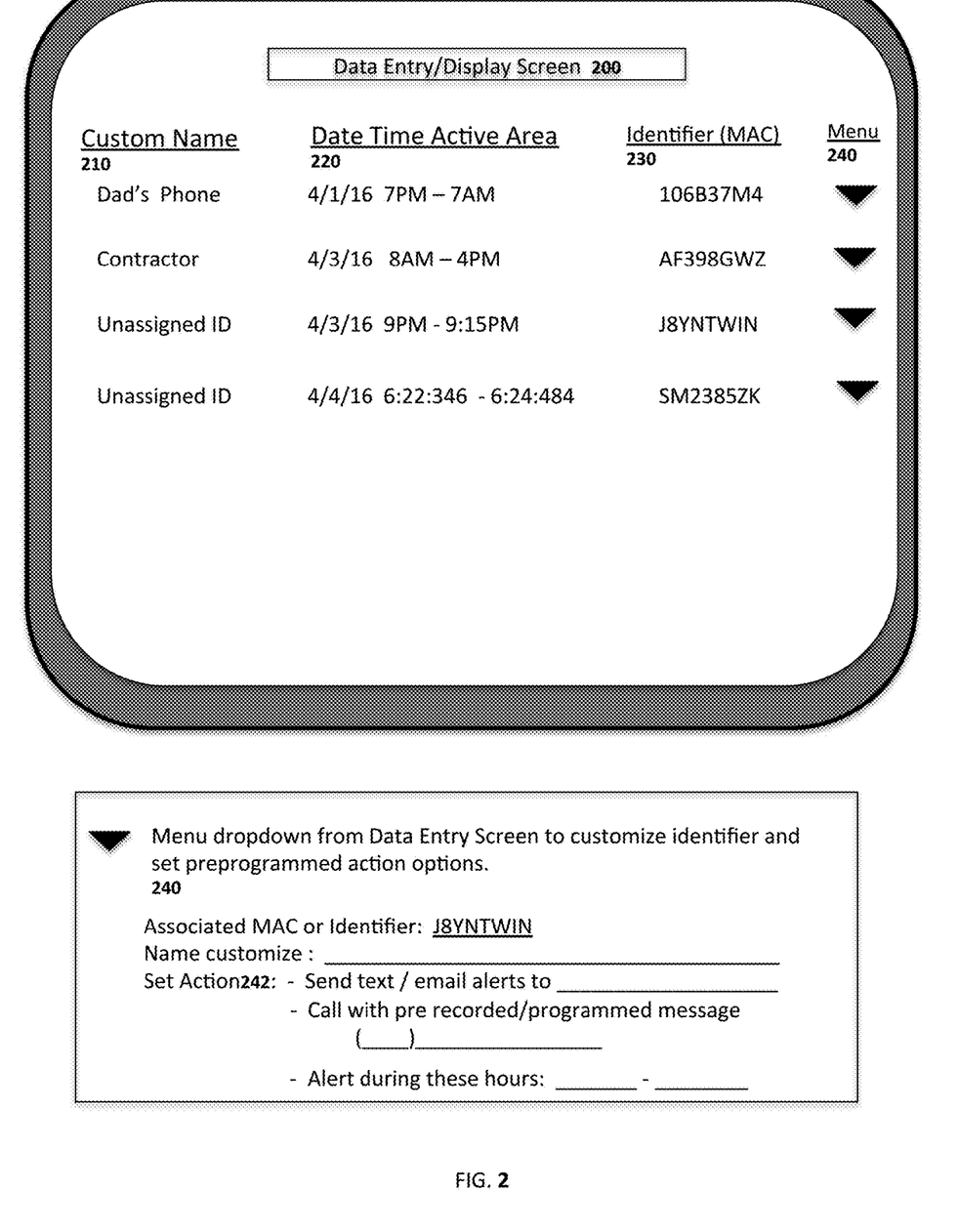
FIG. 2. depicts an embodiment using a data entry screen demonstrating a customizable display with drop-down menu, in accordance with the teachings of the present invention.

FIG. 2 shows one illustrative example of a data entry screen 200 where users can manually annotate specific electronic devices with a descriptive name that would allow the user to easily identify electronic devices (e.g., a device is labeled as "Dad's phone" 210, rather than labeled by its MAC address of 106B37M4 230). The data entry screen 200 also has a date/time/active area column 220. This feature allows the user to easily tell the difference between wireless devices carried by friends, family, or neighbors from unknown wireless devices that may be carrier by intruders. Devices that are custom labeled can be displayed to user in a different manner than unknown devices. Custom labeling can include integrating a picture, icon or coloring known devices rather than generated unknown device display. In this way a user can easily tell the difference between known and unknown device. Menus 240 facilitate the input of data.

As with manual identification of wireless devices described above, these automatically identified devices can be annotated on a display (not shown) to let a user easily differentiate known from unknown wireless devices. FIG. 2 is one illustrative example of how devices can be displayed.

Monitoring Wireless Devices

Embodiments of this invention passively monitor the radio frequency spectrum and logs the details of wireless signals transmitted by wireless devices such as: the transmission type (e.g., Wi-Fi®, Bluetooth®, cellular), frequency, rate, wireless identifiers and/or radio addresses, time of day and duration a wireless device is active in an area, phone number of the detected device, and GPS location where the radio receiver is located, and when wireless signals were captured.

Automatic Identification of Devices

Many wireless electronic devices can also be automatically identified as belonging to family, friends or neighbors of a user. For example, for a Wi-Fi® (802.11) device that a user owns or family, friends, or neighbors of a user own, may know the network name (SSID) and password of user's Wi-Fi® Access Point (AP). In this case, when an authorized wireless electronic device connects to the Wi-Fi® AP, a "handshake" between the two devices occur as defined in the IEEE 802.11 standard that culminates with a successful Association Response message sent by Wi-Fi® AP to wireless device if the wireless device supplied the correct SSID and password to Wi-Fi® AP. In embodiments the monitoring system can monitor for this Association Response message and if the association between wireless device and Wi-Fl® AP is successful, invention can mark wireless device as a known device because a wireless device knows the SSID and password of a Wi-Fi® AP, whereas an unknown device will not know the SSID and password of Wi-Fi® AP, and will not be able to successfully associate. In this way, the monitoring system can automatically identify devices that belong to user or family, friends, or neighbors of user for which the user has given the SSID and password. Other wireless communication protocols such as Bluetooth use a similar mechanism that can also be observed.

Additionally, sometimes wireless devices do not transmit their true identifiers. For example, Apple iOS products initially transmit a false 802.11 MAC address when sending Probe Requests to find available Wi-Fi® Access Points (AP). Once they find a known AP, wireless devices then reveal their true MAC address. In one embodiment, a Probe Response is sent to a wireless device masking its MAC address. The wireless device will then respond with its true MAC address. In this active scenario, the system may attempt to discover wireless device's true MAC address.

Automatic Identification of Neighbor Devices

In other embodiments, devices that belong to neighbors can be identified by passively monitoring of the "Beacon" transmissions from neighboring Wi-Fi® APs. This allows nearby Wi-Fi® APs to be identified. Lists of these neighboring Wi-Fi® APs are saved. When other wireless devices associate with neighboring Wi-Fi® APs, passively observing the Association Response from Wi-Fi® APs as described above and can be used to mark those wireless devices as known devices, even though those devices do not associate with the user's Wi-Fi® AP.

As with manual and automatic identification of wireless devices described above, these automatically identified devices can be annotated on a display (not shown) to let user easily differentiate known from unknown wireless devices.

Automatic Identification of Unknown Neighbor Devices

In another embodiment, if a wireless device does not associate with either user or neighbor's Wi-AP, a wireless device may still be identified as not being on user's property, but still within the monitored boundary. In this case, the monitoring of the Received Signal Strength Indication (RSSI) of wireless signals can be used to calculate the average and standard deviation RSSI of wireless signals for each Wi-Fi® AP. If the RSSI of a new signal is received is not within a pre-determined number of standard deviations (e.g., 2) from the average RSSI reading of wireless device signals, with a high probability, the new signal is coming from a device that is not within the user's property. Furthermore, using the average and standard deviation of all Wi-Fi® APs, the monitoring system can determine the most likely property from which the signal originated.

In other embodiments, triangulation techniques such an angle of arrival (AoA) and time of arrival (ToA) for wireless signal can be used to estimate the location of wireless device within a small distance (less than a meter in some instances). If the wireless device is determined to be outside the user's property, the presence of the device can be logged, sending an alert (described below in pre-programmed events), may optionally be forgone.

Manual and automatic identification of wireless devices, together or separately, can help reduce false alarms where a pre-programed action is taken based on recognition of a wireless device. See below for more details on pre-programmed actions.

Data Storage

Embodiments of the invention record information to an internal storage system memory and/or a remote data storage location. The data can be held in storage memory until the user manually removes information or the data is removed by an automated process residing in memory in accordance with a pre-determined policy or protocol. Data transmission from the invention device to a remote cloud-based storage can be performed via a local network, Wi-Fi®, Bluetooth®, cellular, hard-wired connection or other means of transmission.

Remote cloud-based storage can be beneficial against possible damage to the invention device and systems. Without offline storage, the data collected would be lost if the invention device were destroyed or damaged. If the data is transferred to and stored by remote cloud-based storage, a possible threat including an intruder, vermin or bad weather, for example, will not have physical access to the data to destroy.

Remote storage also lets the user create a web portal to view their data from anywhere in the world.

Pre-programmed Actions

Embodiments can also perform a single, or a number of, pre-programmed actions. Responsive to the detection of wireless device, the invention system may execute a number of predetermined actions. This is performed through pre-programmed action to alert the user of wireless device detected in the monitored area, send an alarm to the police, and/or notify other authorized users of human presence in a monitored area.

With the use of pre-programmed actions embodiments of the invention can also be utilized as an alarm system allowing the user to be notified when a pre-programmed event is indicated. An embodiment of a preprogrammed event can take place upon the detection of a specific electronic identifier registered with the system. For example, say your daughter's ex-boyfriend has a known wireless cell phone identifier registered with the system. If the alarm feature is pre-programmed to send an alert upon ex-boyfriend identifier detected, the user will be notified upon detecting the identifier then taking a pre-programed action.

Unknown wireless devices may also cause a pre-programmed action. For example, it may be the case that no one is expected on a particular monitored area and that the presence of any wireless device could be cause for alarm.

Pre-programmed events may also have a temporal component. For example, pre-programmed action may take place upon the detection of all wireless devices detected within the monitored area after 11 pm until 6 am during weekends. These embodiments are for illustration and understanding purposes but are in no way limited to the broad scope of preprogrammed actions available.

Device Components

Figure 3:
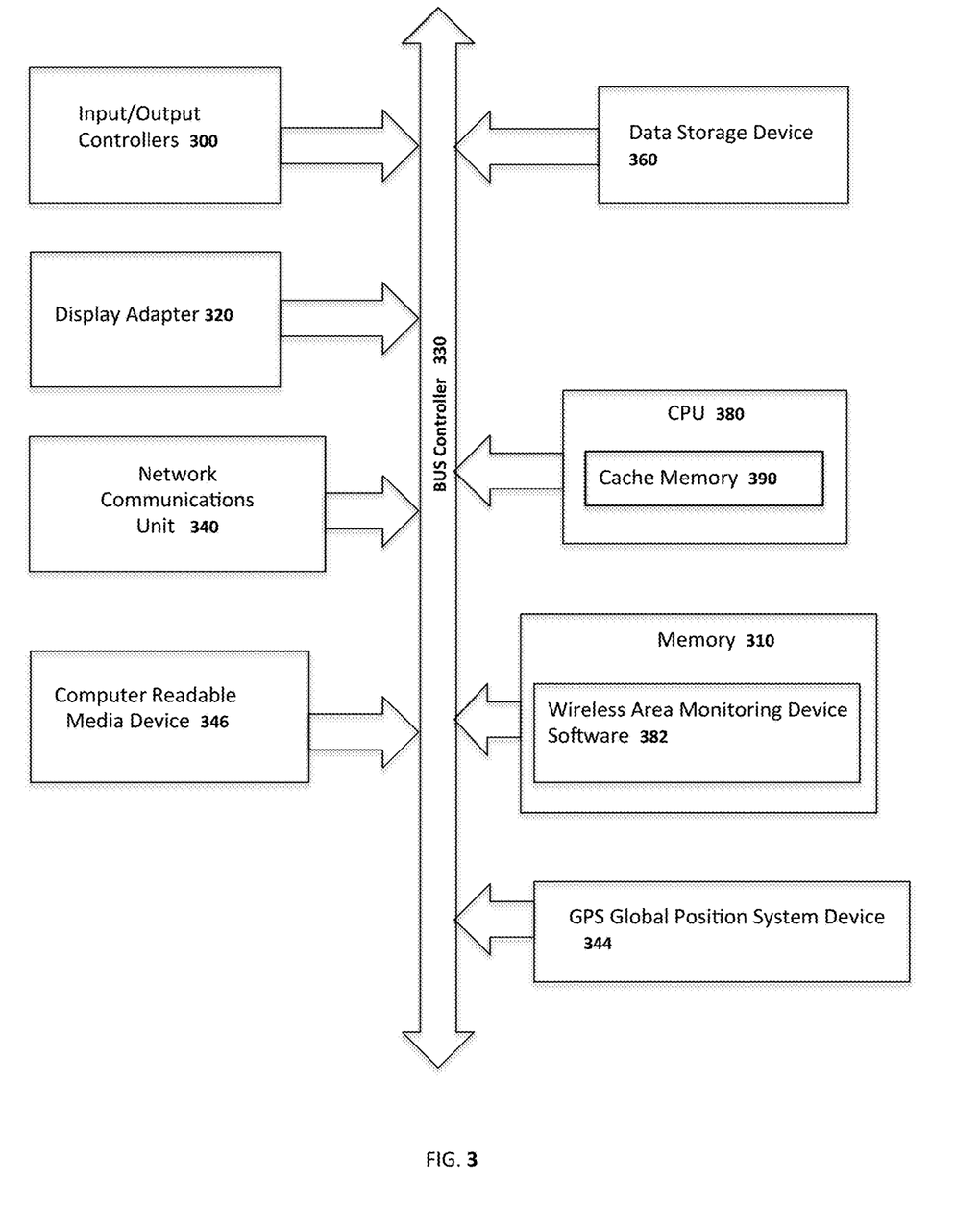
FIG. 3. illustrates a bus system, in accordance with the teachings of the present invention.

FIG. 3 depicts an example of hardware components used in embodiments. The system may have Input/Output Controllers 300 to control interfaces with external devices. It may also have a display adapter 320 to provide output on a monitor or similar human readable device. Transceivers such as Network Communications Units 340 may allow the system to transmit and receive data to and from other devices. Computer Readable Media Devices 346 may provide additional storage or computational capabilities. Data Storage Devices 360 may be used for additional storage. One or more Central Processing Units (CPUs) 380 can be used as a control device and to coordinate interaction between other components and to perform computations. CPU may have one or more multi-processor cores, depending on the particular implementation. Cache Memory 390 may be used by CPU 380 to store copies of the data from the most frequently used areas of main Memory 310 to increase system performance. Memory 310 can be used to store machine executable code such as Wireless Area Monitoring Device Software 382. Global Positioning System (GPS) 344 can allow determination of latitude and longitude coordinates. Finally, a Bus Controller 330 can be used to connect various components.

Embodiments of this invention may utilize an existing residential or commercial AC outlet power supply or alternatively may utilize battery, solar, wind or other off-grid type power sources. Embodiments of this invention can be linked to home wireless router for data transfer via Internet, cellular or other transmission. The invention can be remotely or manually powered on or off and scheduled for constant monitoring or set to monitor for specified times of day.

Range of detection may increase or decrease with the use of gain control or using directional antenna(s). The monitored area can encompass either an indoor and or outdoor area.

The collected data can be stored safely internally or uploaded to a cloud-based storage and accessed by customer for review immediately or in the future. Data transfer to a remote storage, for example to a cloud-based storage, can take place either upon detection, scheduled within certain time intervals/by quantity of data compiled.

Still more aspects, embodiments, uses and advantages of the invention will be apparent when the Description herein is read along with the Drawings.

Integrated with "Smart Home" System

Embodiments may be integrated to accompany smart home systems.

One embodiment would allow the system to be configured to turn exterior or interior lighting or upon the detection of a wireless device signal within the monitored area boundary area. This would be of used beyond the standard "motion sensor" lighting due to, but not limited by the ability to detect the presence of a wireless device around corners, through walls and other structures.

Monitoring System Embodiments

Figure 4:
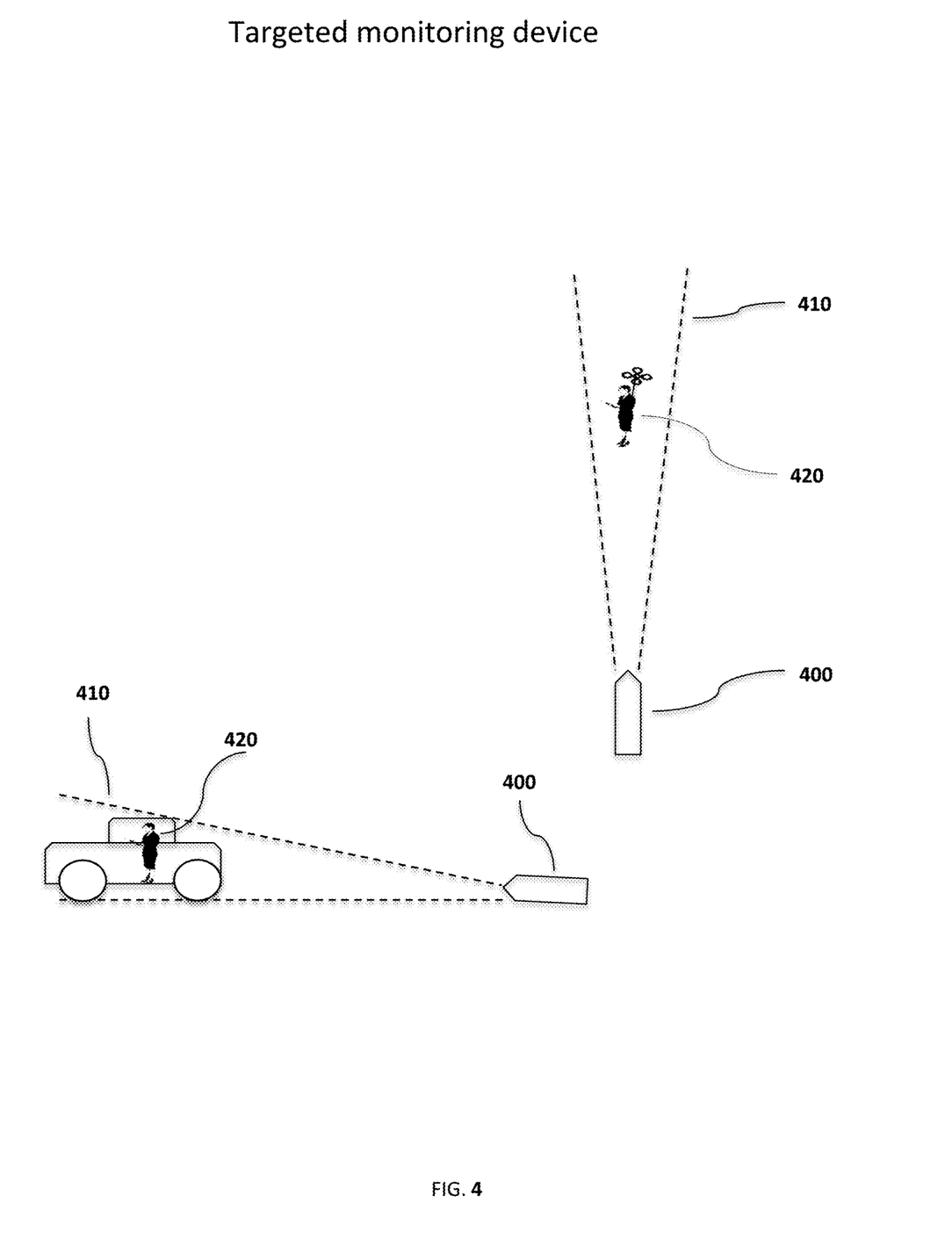
FIG. 4. illustrates a targeted monitoring system with the teachings of the present invention.

Embodiments, illustrated in FIG. 4, may be configured to monitor for wireless devices being present in a restricted pathway or narrowly defined area. Much like the way a law enforcement agent uses a radar detection device, embodiments of the monitoring device system may be configured to target monitor with pin-point type accuracy. Configurations would allow a mobile handheld embodiment of the monitoring system with directional monitoring capabilities much like a handheld scanning or radar detection device. This would allow greater mobility to monitor areas in a pathway or limited spatial dimension.

With the use of transceivers equipped with directional antennas 400, monitoring a restricted pathway of reception 410 is possible. Additionally, the restricted pathway of monitored reception may be increased or decreased in width and length of range of reception. This range of reception would look much like the "V" cone shaped wedge 410, to monitor varying degrees of an area. This would allow monitoring of a restricted pathway or limited spatial dimension for unique wireless signals emanating from wireless electronic devices 420 carried by, but not limited to humans, autonomous or remotely operated vehicles.

Figure 5:
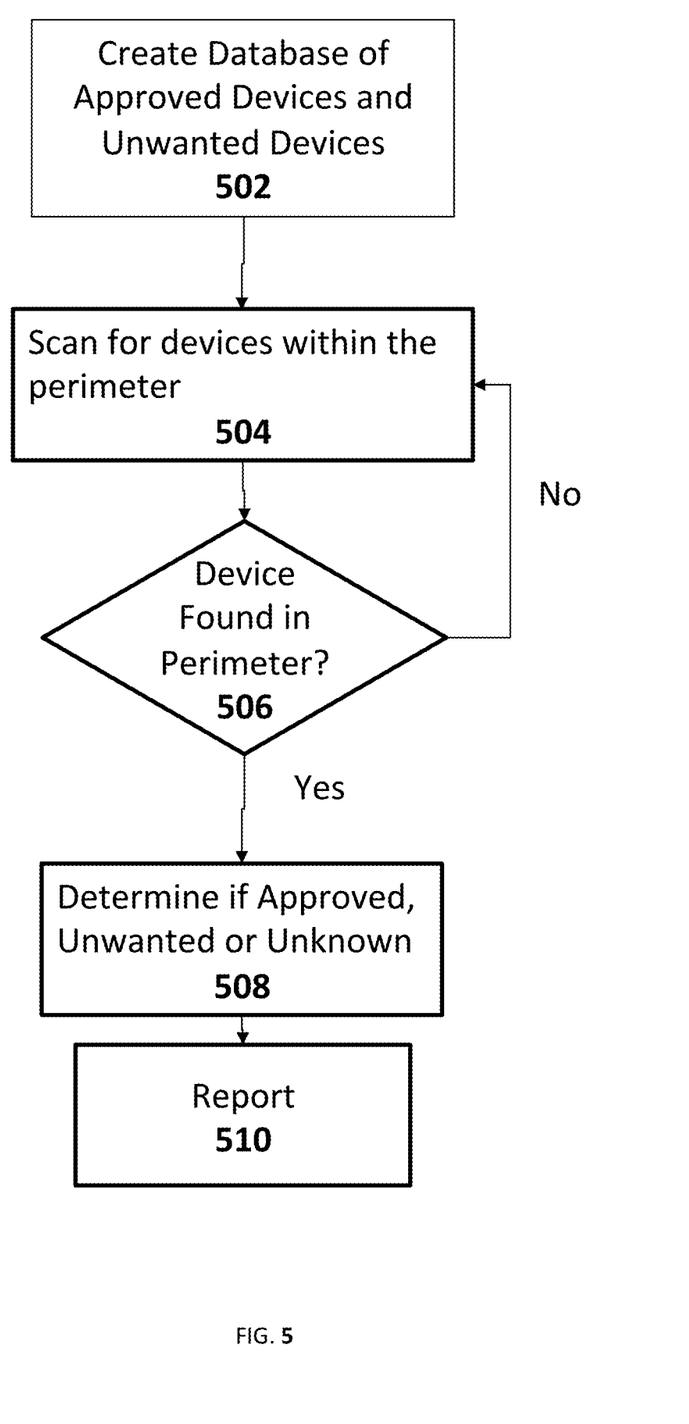
FIG. 5. depicts a method for monitoring within a perimeter, creating a database and reporting data in accordance with the teachings of the present invention.

FIG. 5 depicts an embodiment of the invention. A method is presented that is designed for detecting unknown or known and unwanted digital devices, equipped with wireless transceivers, within the bounds of a defined perimeter comprising: creating a database 502 of digital device IDs for devices that are 1) acceptable and 2) known but unwanted to be operated within the perimeter, and storing the database in a computer memory accessible by a processor; scanning 504 for digital transmissions within the perimeter using a plurality of wireless transceivers configured to scan using a plurality of digital protocols, frequencies and modulations; when a digital transmission is acquired 506, if possible, establish a two-way communication between the device emitting the digital transmission and the one or more of the plurality of transceivers and determine one or more of: the direction the transmission is coming from relative to the location of the one or more receiving transceivers, the approximate location of the emitting device, the signal strength for the transmission, and a unique device identification; storing in memory, for all of the acquired transmissions: the relative direction from the one or more detecting transceivers, the location, the ID and the signal strength in the database; executing instructions on the processor to compare the IDs of the detected devices with those of the approved devices to determine if the acquired ids are from acceptable devices 508; and if a transmitter location is determined: for each digital transmission that exceeds the minimum signal strength required to be detected at the distance between the perimeter and the receiving transceiver, measured in the direction of the transmission, report the ID and optionally the location within the perimeter based on the signal strength; and if the location of a detected device was determined and it is within the perimeter, report the ID and location within the perimeter to the user; and report the findings 510.

Referring also to FIG. 5 in another embodiment in which a single transceiver is used (system may be entirely contained in a portable electronic device, for example a smartphone) and the perimeter is a regular shape, for example a sphere or a conical shape when the transceiver is used in conjunction with a directional antenna).

A method for detecting unknown digital devices or known and unwanted digital devices, equipped with wireless transceivers, within the bounds of a regular perimeter comprising: creating a database of digital device IDs for devices that are 1) acceptable, and 2) known but unwanted to be operated within the perimeter, and storing the database in a computer memory accessible by a processor 502; scanning 504 for digital transmissions within the perimeter using a wireless transceiver with a distance of detection at or greater than the desired radius of the regular perimeter and configured to scan using a plurality of digital protocols, frequencies and modulations; for each digital transmission acquired by scanning, attempt to establish two-way communications between the device emitting the digital transmission and the transceiver, and acquire the signal strength for the transmission, and a unique device identification 506; store the established IDs and signal strengths for each transmission at each receiving transceiver in the database; using instructions on the processor, compare the IDs of the detected devices with those of the approved devices and known but unwanted devices to determine if the acquired IDs are from acceptable devices, unacceptable or unknown devices 508; and report the findings 510.

Alternative embodiments would allow for a restricted pathway or targeted monitoring configuration of the invention to detect wireless signals. For example, this would allow law or government officials to scan specific geographical areas for specific wireless devices associated with criminals or sought-after individuals. In order to detect where the wireless device is located, a mobile or handheld configuration may be used to scan a specific building where a criminal is known to harbor.

Another embodiment would allow, for example, law or government officials to scan an automobile for wireless device(s) while pulling over a suspect vehicle alongside a roadway. This may generate information including the number of wireless devices, specific identifier(s) that can be matched with a list of known wireless devices in a criminal database. If the identifier matches a sought after wireless device, a pre-programmed alert can be sent to the law or government official. The law enforcement official can then take the appropriate precautions or actions all before approaching the suspect vehicle.

Restricted pathway or targeted monitoring configuration may also be helpful in search and rescue situations. For example, an aerial configuration of the invention device would be beneficial in finding a lost hiker in the wilderness or a remote mobile hand-held configuration of the monitoring device may help find a skier trapped under the snow of an avalanche. These are just an example of the many uses and are not mean to limit embodiments of the various invention configurations broader utility.

A growing area of technology is the use of autonomous vehicles, robotics and drones and the like utilized in everyday life. Generally this technology is equipped with BLUETOOTH®, Wi-Fi®, cellular, Global Positioning System or similar wireless device equipment embedded into this burgeoning technology. Much like the above embodiments, early detection of this technology's wireless device is possible. In addition to the data obtained as described above, embodiments may also allow the system to act as an early alert monitor similar to the way a driveway alarm works to detect an approaching vehicle on a property. For example, an aerial drone may be delivering a package to the users residence or location, the area monitoring system may allow the detection of the drone, log associated data with the event and take a number of pre-programmed actions including sending a text or email alert regarding the delivery. As this technology continues to expand into our everyday life, we see this as an integral developing embodiment of the invention.

Embodiments of the invention may be deployed in low-cost, highly-configurable configurations with small RF footprint using directional antennas and power control.

Figure 6:
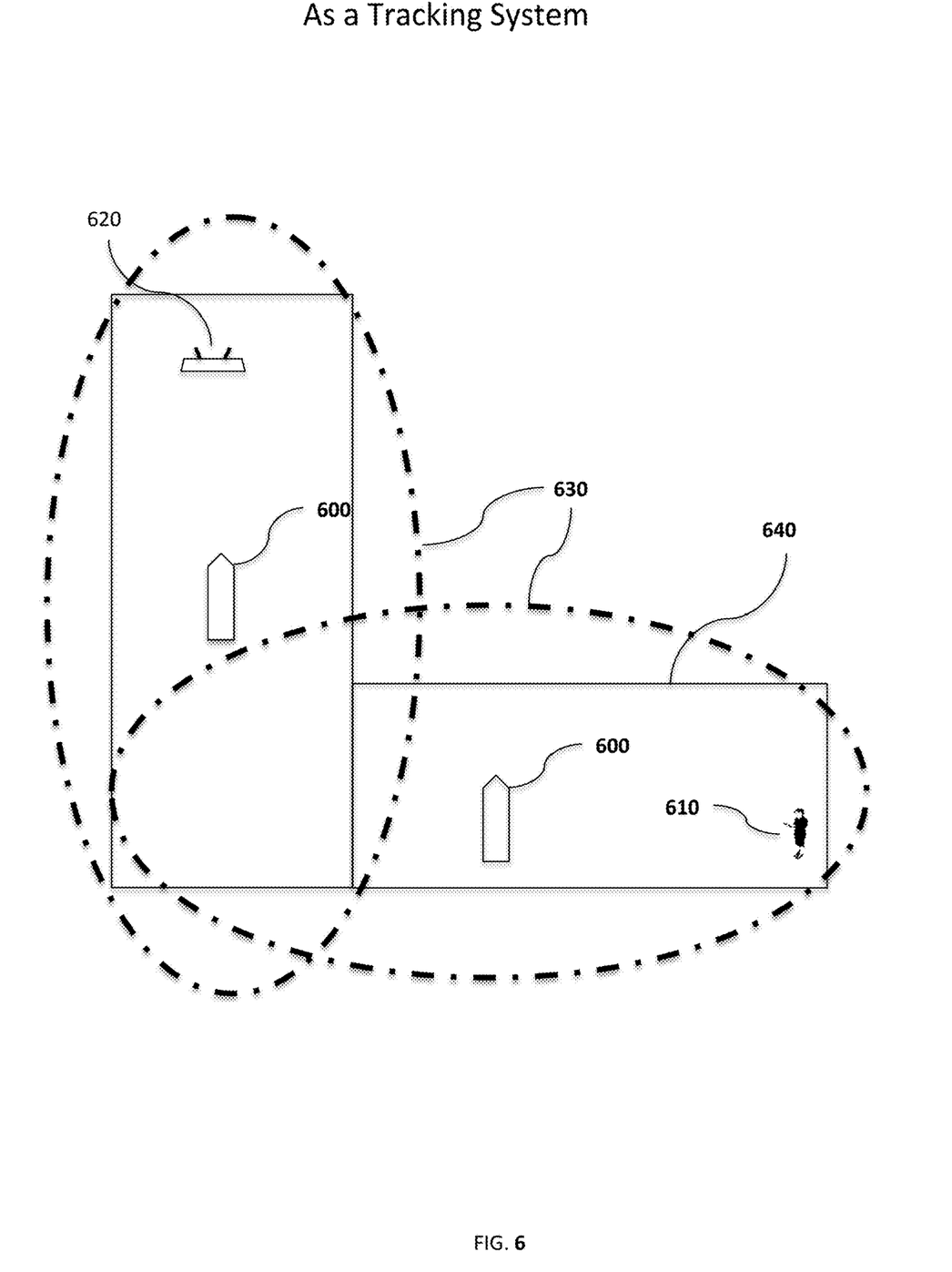
FIG. 6. Illustrates interconnected monitor configuration as large area as tracking system and location system.

FIG. 6 illustrates an embodiment configured utilizing multiple interconnected detectors 600. In this configuration the system creates a larger monitored boundary area 680. This larger system can work not only as a wireless device area and property monitor but may allow utility as a wireless device tracking and locating system. Using multiple interconnected transmission detectors 600 allows greater accuracy to determine the location of a wireless device 610. With triangulation techniques such an angle of arrive (AoA) and time of arrival (ToA) to determine location and movements of wireless transmission devices 610 to less than meter accuracy.

Multiple interconnected transmission detectors 600 allow tracking and recording of the movement of a detected wireless devices 610 within a monitored area boundary 630. For example, this larger monitored area 630 may be used in large commercial building 640 like an airport, industrial or business park to track movement or locate a specific wireless device 610. Similar preprogrammed actions, as described above, can be performed. These actions include security monitoring, detection, identification; logging of data and information recording can be performed. In addition, the movements of detected wireless device 610 can be monitored and viewed in real time or transferred by local network 620, then logged in data storage for later review.

Figure 7:
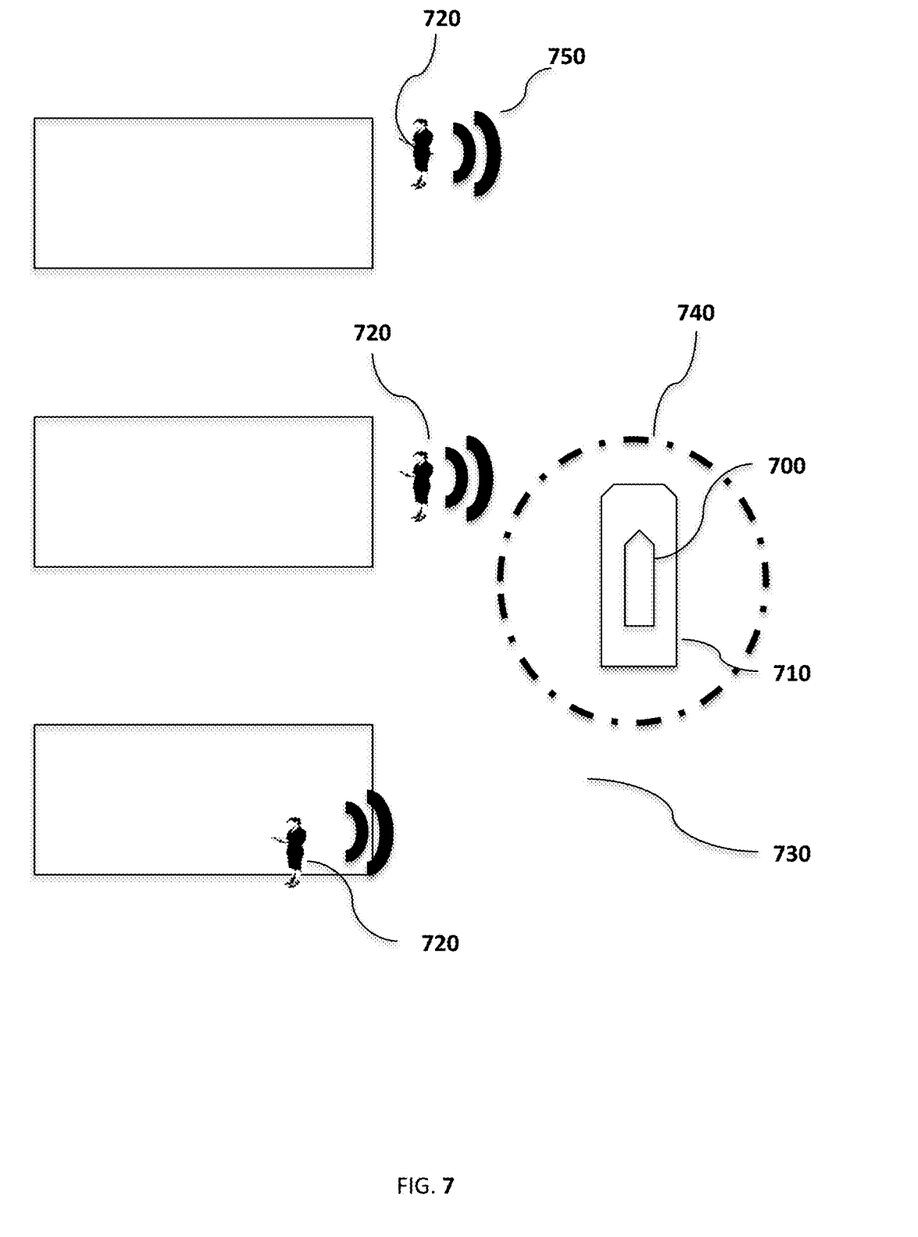
FIG. 7. Illustrates mobile mounted digital monitoring mapping method.

FIG. 7 illustrates an embodiment of the invention as a vehicle mounted mobile digital device. Configurations of the device and system 700 allow one use case for a mobile embodiment is to provide additional functionality for mapping services of a mobile mapping van 710 or mobile vehicle equipped with cameras, side sweeping lasers and a GPS device for navigation and recording information. Equipped wireless mapping vehicles may function to capture wireless device 720 identifiers from emanating wireless signals 750 by driving through specific locations 730, creating a moving monitored area boundary 740 which can be performed at various times though out the day. The invention system can then correlate this information with the mapping information to acquire a wireless device identifier map. With the use of algorithms and machine learning techniques increased mapping of accurate wireless identifiers may be accomplished.

An example of two basic methodologies used in embodiments of the invention are: (1) establish a perimeter and only track devices inside the perimeter, or (2) watch all devices within the detection limits of the monitoring system. A perimeter can be established by doing a 3-dimensional localization based on incoming signal characteristics. Variants of the well-known MUSIC algorithm try to do this by looking at the phase of the incoming signal to determine the angle the signal arrived from. Some approaches use multiple devices to try to narrow down the location of the transmitter to less than a meter. Other approaches use a single device with multiple antennas to estimate the transmitter's location, although they are normally somewhat less accurate. The article in SpoFi (2015) entitled "Decimeter Level Localization Using WiFi" by Manikanta Kotaru, Kiran Joshi, Dinesh Bharadia, Sachin Katti, Stanford University discusses methods, which is incorporated herein by reference. This described approaches, would allow mapping out any shape perimeter desired and if the transmitter is estimated to be within the boundaries of the shape, a log could be sent or an alert.

Another approach would is to fingerprint the radio frequency environment ahead of time (what the incoming transmission will look like within the perimeter) using a method as described in "You are Facing the Mona Lisa: Spot Localization using PHY Layer Information" by Souvik Sen, Božidar Radunović, Tom Minka, and Romit Roy Choudhury in MobiSys'12, Jun. 25-29, 2012, which is incorporated herein by reference.

An example of use would be to monitor for mobile devices that connect to other devices that are always in the vicinity of the monitoring device. For example, a mobile device successfully connects to your neighbor's Wi-Fi® Access Point (AP). The AP can be detected based on its beacons and the handshake can be monitored as a device connects to it. That way it can be determined that a device probably belongs to a neighbor (or one of his friends/relatives) because it knew the password to connect to the AP and we would probably note its presence in the database, but would probably not sound an alarm because of it. In a sparse-living environment such as a remote farmhouse, it is not needed to worry about neighbors. No devices are connecting to nearby APs (because there aren't any nearby APs), so any signal seen should be part of an alert. Bluetooth would work in a similar manner.

The above approaches could also be used in tandem and match these two approaches to have three possible combinations. One method would be to use a perimeter and log any devices that enters the perimeter based on a localization estimate. An alarm could sound for any device (although this would be impractical in an apartment environment because a localization estimate will occasionally miss the device's true location). Yet another method is to use a second method and combine the perimeter with automatically determining which devices belong in an area by watching them connect to other devices that are always in the area. That way when a next door apartment neighbor comes home, and the localization estimate incorrectly puts him inside your perimeter boundaries, it can be realized it is a known device and don't sound an alarm (but probably do log his presence in case your neighbor is the one stealing your stuff). This could also be done by using the device identification method only and not establishing a perimeter, but instead log any device that comes in range.

The embodiments of the present invention disclosed herein are intended to be illustrative only, and are not intended to limit the scope of the invention. It should be understood by those skilled in the art that various modifications and adaptations of the prevent invention as well as alternative embodiments of the prevent invention may be contemplated or foreseeable. It is to be understood that the present invention is not limited to the sole embodiments described above, but encompasses any and all embodiments within the scope of the following claims.

The invention claimed is:

1. A process for detecting digital devices, the process comprising:
   passively detecting, by a wireless transceiver, a presence of wireless signals both within a defined perimeter and an environment that extends beyond the defined perimeter
   verifying, for each detected wireless signal, whether that wireless signal was transmitted by a corresponding digital device from a position that is within the defined perimeter;
   attempting to ascertain an identifier for each digital device that is verified as being present within the defined perimeter, without an association between the wireless transceiver and the corresponding digital device;
   performing a first action for each digital device that is verified as being present within the defined perimeter, whose identifier is known and determined to be authorized to be present within the defined perimeter;
   performing a second action for each digital device that is verified as being present within the defined perimeter, whose identifier is known and determined to be unauthorized to be present within the defined perimeter; and
   performing a third action for each digital device that is verified as being present within the defined perimeter, whose identifier is unknown;
   wherein:
      attempting to ascertain an identifier, performing the first action, performing the second action, and/or performing the third action is carried out only for a digital device that is within the defined perimeter.

2. The process of claim 1, wherein verifying, for each detected wireless signal, whether that wireless signal was transmitted by a corresponding digital device from a position that is within the defined perimeter comprises triangulating a position of the corresponding digital device by using three wireless transceivers with overlapping detection ranges.

3. The process of claim 1 further comprising:
receiving a false identifier from a digital device; and
establishing a two-way communication between the digital device and the wireless transceiver to transmit a probe response to the digital device to receive a true identifier from the digital device.

4. The process of claim 1 further comprising marking a digital device as known by passively observing an association response between the digital device and a third-party access point, wherein the third-party access point is independent of the wireless transceiver.

5. The process of claim 1, wherein the defined perimeter is irregular, and passively detecting, by the wireless transceiver comprises passively detecting by a plurality of transceivers, wherein each of the plurality of transceivers is placed such that each portion of the area within the defined perimeter is within the detection limits of at least one of the plurality of transceivers.

6. The process of claim 1 further comprising:
storing a list of digital devices that are authorized to be present within the defined perimeter;
wherein the list of devices that are authorized to be present comprises all digital devices known to the wireless transceiver.

7. The process of claim 1 further comprising:
detecting a direction of a detected one of the wireless signals; and
training a surveillance device to monitor in the direction of the determined location of the detected wireless signal.

8. The process of claim 1, wherein passively detecting by a wireless transceiver, a presence of wireless signals, comprises monitoring a cone shaped perimeter by using a directional antenna that communicably couples to the wireless transceiver.

9. The process of claim 1, wherein performing a third action for each digital device that is verified as being present within the defined perimeter, whose identifier is unknown comprises sending an alert to a user.

10. A system for detecting digital devices, the system comprising:
a wireless transceiver that passively detects a presence of wireless signals both within a defined perimeter and an environment not within the defined perimeter, using at least one wireless communication; and
a processor coupled to memory, where the processor executes program code stored in the memory to:
verify, for each detected wireless signal, whether that wireless signal was transmitted by a corresponding digital device from a position that is within the defined perimeter;
attempt to ascertain an identifier only for each digital device that is verified as being present within the defined perimeter, without an association between the wireless transceiver and the corresponding digital device;
perform a first action for each digital device that is verified as being present within the defined perimeter, whose identifier is ascertained and determined to be authorized to be present within he defined perimeter;
perform a second action for each digital device that is verified as being present within the defined perimeter, whose identifier is ascertained and determined to be unauthorized to be present within the defined perimeter; and
perform a third action for each digital device that is verified as being present within the defined perimeter, whose identifier is unknown.

11. The system of claim 10, wherein the wireless transceiver passively detects a radio frequency spectrum.

12. The system of claim 10, wherein the processor further executes program code stored in the memory to log details of each detected wireless signal including at least transmission type, time of day, and duration that a wireless device associated with the detected wireless signal is within the defined perimeter.

13. The system of claim 10, wherein the processor executes program code stored in the memory to attempt to ascertain an identifier, perform the first action, perform the second action, and/or perform the third action is carried out only for a digital device that is within the defined perimeter.

14. The system of claim 10, wherein the processor further executes program code to:
determine that a location of a detected digital device is not within the defined perimeter, emanated a wireless signal within the defined perimeter;
log the digital device that is not within the defined perimeter; and
exclude wireless signals from the excluded digital device for the generation of alerts.

15. The system of claim 14, wherein the processor further executes program code to:
determine that the digital device is not within the defined perimeter by executing program code to locate the digital device by at least one of received signal strength indication, angle of arrival, and time of arrival.

16. The system of claim 10, wherein the wireless transceiver passively monitors a radio spectrum and the processor logs details of detected wireless signals so as to log at least transmission type, time of day, and duration that a detected wireless devices is active within the defined perimeter.

17. The system of claim 10, wherein the processor further executes program code to:
receive a false identifier from a digital device; and
transmit a probe response to the digital device to receive a true identifier from the digital device.

* * * * *